(12) United States Patent
Briand et al.

(10) Patent No.: US 11,704,288 B2
(45) Date of Patent: Jul. 18, 2023

(54) AIRCRAFT COMPUTER FILE DISTRIBUTION SYSTEM, ASSEMBLY AND METHOD

(71) Applicant: DASSAULT AVIATION, Paris (FR)

(72) Inventors: Benjamin Briand, Saint Cloud (FR);
Michaël Ociepka, Saint Cloud (FR);
Stéphane Ardouin, Saint Cloud (FR);
Vincent Hubert, Saint Cloud (FR);
Nicolas Lhopiteau, Saint Cloud (FR)

(73) Assignee: DASSAULT AVIATION, Paris (FR)

( * ) Notice: Subject to any disclaimer, the term of this patent is extended or adjusted under 35 U.S.C. 154(b) by 0 days.

(21) Appl. No.: 17/332,319

(22) Filed: May 27, 2021

(65) Prior Publication Data

US 2021/0374101 A1    Dec. 2, 2021

(30) Foreign Application Priority Data

May 28, 2020  (FR) ...................................... 20 05637

(51) Int. Cl.
*G06F 16/178*  (2019.01)

(52) U.S. Cl.
CPC .................. *G06F 16/178* (2019.01)

(58) Field of Classification Search
USPC ....................................................... 707/610
See application file for complete search history.

(56) References Cited

U.S. PATENT DOCUMENTS

| | | | |
|---|---|---|---|
| 6,438,468 B1 | 8/2002 | Muxlow et al. | |
| 8,723,645 B2* | 5/2014 | Ayyagari | G06Q 10/00 340/13.26 |
| 10,795,668 B2* | 10/2020 | Leibham | G06F 8/65 |
| 10,819,791 B2* | 10/2020 | Bobrek | H04W 84/06 |
| 11,455,285 B2* | 9/2022 | Hernoust | G06F 16/27 |
| 2016/0154642 A1 | 6/2016 | Mason et al. | |
| 2019/0187978 A1* | 6/2019 | Leibham | G06F 11/1433 |
| 2020/0331620 A1* | 10/2020 | Scheid | G06F 16/2379 |

FOREIGN PATENT DOCUMENTS

| | | | |
|---|---|---|---|
| EP | 1426870 A2 | 6/2004 | |
| EP | 1426870 A3 | 9/2004 | |

OTHER PUBLICATIONS

Search Report for priority application FR 2005637.

* cited by examiner

*Primary Examiner* — Cam Linh T Nguyen
(74) *Attorney, Agent, or Firm* — Davidson, Davidson & Kappel, LLC

(57) ABSTRACT

An aircraft computer file distribution system comprises a store (36) of aircraft computer files for loading into at least one aircraft device (12) that is onboard, mobile or replicated on the ground. The system includes a file manager (44), configured for identifying an aircraft configuration of the aircraft with which the aircraft device (12) is associated and a computer configuration of the aircraft device (12); defining, among the computer files in the computer file store (36), at least one computer file loadable into the aircraft device (12) according to the identified aircraft configuration and computer configuration; and activating a synchronization for remote distribution of at least one computer file to be loaded into the aircraft device (12) selected from the one or more computer files loadable into the aircraft device (12) based on the identified aircraft configuration and computer configuration.

18 Claims, 13 Drawing Sheets

| ACTION | CODE | LABEL | LAST VERSION | CATEGORY | CREATED DATE | MODIFIED DATE |
|---|---|---|---|---|---|---|
| 👁 ✏ | AAA | F900DX | 2.1.0 | △ | 1/26/19 5:00 PM | 3/26/19 2:00 PM |
| 👁 ✏ | BBB | MANUAL | 2.1.2 | ☐ | 1/25/19 4:00 PM | 3/22/19 1:00 PM |
| 👁 ✏ | CCC | WEATHER | 3.0.0.1 | ☐ | 1/24/19 3:00 PM | 21/21/19 2:36 PM |

SERVICE LIST — 78

FIG.8

| NAME | PI | M | A | PR | ID | 82 |
|------|----|----|----|----|-----|----|
| U1 | 83 ☑ | ☑ | ☑ | ☑ | AAA | |
| U2 | ☐ 83 | ☑ | ☐ | ☑ | BBB | |
| U3 | ☑ | ☐ | ☐ | ☑ | CCC | |

FIG.13

AIRCRAFT COMPUTER FILE DISTRIBUTION SYSTEM, ASSEMBLY AND METHOD

The present disclosure relates to a remote distribution system for computer files containing data or applications for aircraft in particular, the system comprising:

a aircraft computer file store, containing data or applications in particular, the computer files being intended for loading into at least one aircraft device that is onboard, mobile or replicated on the ground comprising a processor and a memory, the aircraft device being associated with at least one aircraft.

In particular, such a system is intended to distribute computer files to a plurality of onboard or non-onboard aircraft devices, for one or more aircraft in a fleet of aircraft.

BACKGROUND

The management of updates to computer files present in an onboard device in an aircraft, such as an onboard computer or in devices linked to the aircraft, such as an electronic flight bag, is a tedious task.

Indeed, an aircraft generally comprises a multitude of software applications, databases, computation engines present in aircraft devices distributed in several domains, for example a domain to control the aircraft in flight, in particular for piloting and navigating it, a domain to operate the aircraft, and, in particular, to carry out its maintenance or to deal with faults and breakdowns, and a domain to offer services to the passengers, in particular with regard to comfort and entertainment.

The computer files present in onboard and non-onboard devices, especially the software applications and data present in these devices, are constantly evolving. It is therefore necessary to perform updates within each aircraft, or each device associated with an aircraft, more or less frequently, depending on the domain.

In addition, the of software application and associated data sources may come from different actors, including the aircraft manufacturer, in particular for documentation, system, or aircraft identity data, the aircraft operator, in particular for operational rules, minimum equipment lists, or from external suppliers, for example for updating maps or entertainment programs.

The aircraft devices associated with each aircraft are varied. These devices comprise onboard computers, maintenance, comfort or entertainment management computers, for example, or portable flight planning and/or control or maintenance devices. They have a variety of computer configurations.

Typically, the installation of computer file updates requires an operator to load the update(s) into the relevant device(s). For onboard devices, it is often necessary to stop the aircraft.

For example, USB sticks are prepared for each aircraft in a fleet, the operating data is updated, and, when physical access is possible, the computer files are installed.

This requires local configuration management on each of the devices, and manual management of the software parameters, device by device, depending in particular on the configuration of the aircraft with which the device is associated and/or the computer configuration of the device.

This distribution system is therefore very tedious to implement and requires extensive logistics and organization, and, in some cases, even a long immobilization of the aircraft, affecting its operation.

SUMMARY

One aim of the present disclosure is to provide a remote distribution system that is simple to manage and use, and that minimizes aircraft downtime even when a large number of devices must be updated, or even when a fleet of aircraft must be managed.

To this end, a system of the above type, is provided that includes:

a file manager, configured for:
  identifying an aircraft configuration of the aircraft with which the aircraft device is associated and a computer configuration of the aircraft device;
  defining, from among the computer files of the computer file store, at least one computer file loadable into the aircraft device according to the identified aircraft configuration and computer configuration;
  activating a synchronization, automatically or on a user's command, for remote distribution of at least one computer file to be loaded into the aircraft device, selected from among the one or more computer files loadable into the aircraft device according to the identified aircraft configuration and computer configuration.

The system according to the present disclosure may comprise one or more of the following features, taken alone or in any technically feasible combination:

the system comprises a communication interface with at least one source of computer files generated by a manufacturer of the aircraft, with at least one source of computer files generated by an operator of the aircraft, and/or with at least one source of aircraft computer files generated by a provider of aircraft computer files, the communication interface being configured to enable loading new computer files into the file store from the or each source;

the system comprises a communication interface with a client database, the client database defining loading rights, for each aircraft device user, and/or subscriptions related to that user for that aircraft device, the file manager being configured for querying the client database to define the or each computer file(s) loadable into the aircraft device according to the loading rights, and/or subscriptions linked to that user for that aircraft device;

the file manager is configured for generating data of a device management graphical interface comprising an identification of the aircraft device type, a list of computer files present in the aircraft device, an identification of computer files to be updated in the aircraft device and/or an identification of computer files to be added to the aircraft device, from among the computer file(s) loadable into the aircraft device, according to the identified aircraft configuration and computer configuration;

the file manager is configured for generating data for a fleet management graphical interface comprising a summary of all the aircraft devices associated with an aircraft or/and an aircraft fleet and the computer files loadable into each aircraft device of all the aircraft devices associated with the aircraft or/and the aircraft fleet;

the file manager is configured for generating data of a configuration editing graphical interface, allowing a user to select the computer file(s) that must be loaded into the aircraft device, from among the computer files loadable into the aircraft device, according to the identified aircraft configuration and computer configuration;

the file manager is configured for generating graphical interface data of management publications comprising a list of computer files published in the file store, for loading into at least one aircraft device;

the file manager is configured for generating graphical interface data for comparing aircraft device configurations, comprising a comparison between the computer files present on a first aircraft device and the computer files present on a second aircraft device;

the file manager is configured for generating data for a rights management graphical interface, configured for allowing the definition of user rights and/or subscriptions, the file manager being configured for defining the computer file or files loadable into the aircraft device according to the user rights and/or subscriptions defined in the rights management graphical interface;

the file manager is configured for identifying at least one test file, from among the files loadable into the aircraft device, intended to be offered only to certain users and/or to certain aircraft devices;

the computer files of the file store are selected from among software applications, calculation kernels or software modules without a user interface, databases, in particular databases of documentation, system states, aircraft configuration, minimum equipment lists, procedures, operational rules, geographical or aeronautical data, and/or crew data.

The present disclosure also relates to an assembly comprising at least one aircraft device, preferably selected from an onboard aircraft device or a non-onboard aircraft device, and a remote distribution system as defined above.

The assembly according to the present disclosure may comprise one or more of the following features, taken alone or in any technically possible combination:

the aircraft device is a sub-system for remote file distribution to other aircraft devices;

the remote distribution system comprises an onboard cache for duplicating the file store, the file manager being configured for enabling duplication in the onboard cache of at least part of the computer files contained in the file store, including computer files loadable into at least one aircraft device but not necessarily required to be loaded into an aircraft device, with the synchronization of computer files required to be loaded into the aircraft device being carried out from the onboard cache The present disclosure also relates to a method for remote distribution of aircraft computer files to at least one aircraft device, the method comprising the following steps:

providing a remote distribution system as defined above;

the file manager identifying an aircraft configuration of the aircraft with which the aircraft device is associated and a computer configuration of the aircraft device; and defining, from among the computer files in the computer file store, at least one computer file loadable into the aircraft device according to the identified aircraft configuration and computer configuration;

setting up data transmission between the aircraft device and the remote distribution system;

activating a synchronization, automatically or on a user's command, for remote distribution of at least one computer file to be loaded into the aircraft device, selected from among the one or more computer files loadable into the aircraft device according to the identified aircraft configuration and computer configuration.

BRIEF SUMMARY OF THE DRAWINGS

The present disclosure will be better understood upon reading the following description, given by way of example only, and made with reference to the attached drawings, in which:

FIG. 8 illustrates a graphical interface for publishing new computer files;

FIG. 13 illustrates a graphical user interface for rights management.

DETAILED DESCRIPTION

Figure 2:
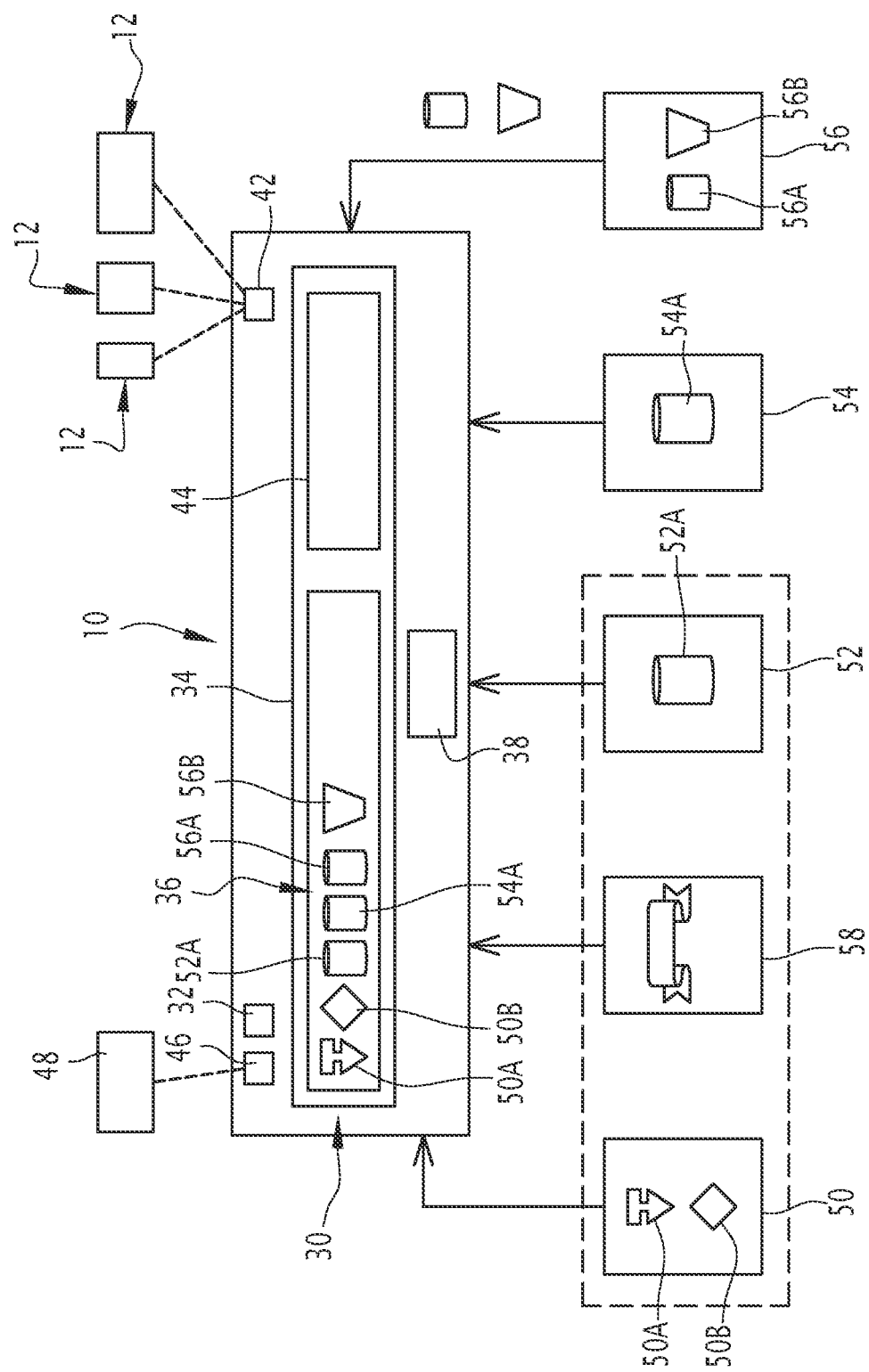
FIG. 2 schematically illustrates a first remote distribution system according to the present disclosure.

A first remote distribution system 10 according to the present disclosure is schematically illustrated in FIG. 2.

Figure 1:
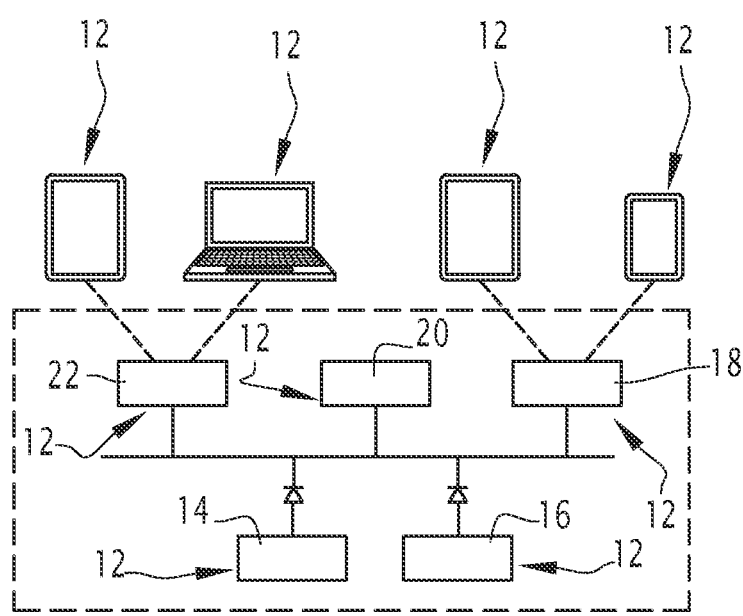
FIG. 1 schematically illustrates an aircraft according to the present disclosure and aircraft devices associated with this aircraft.
Figure 3:
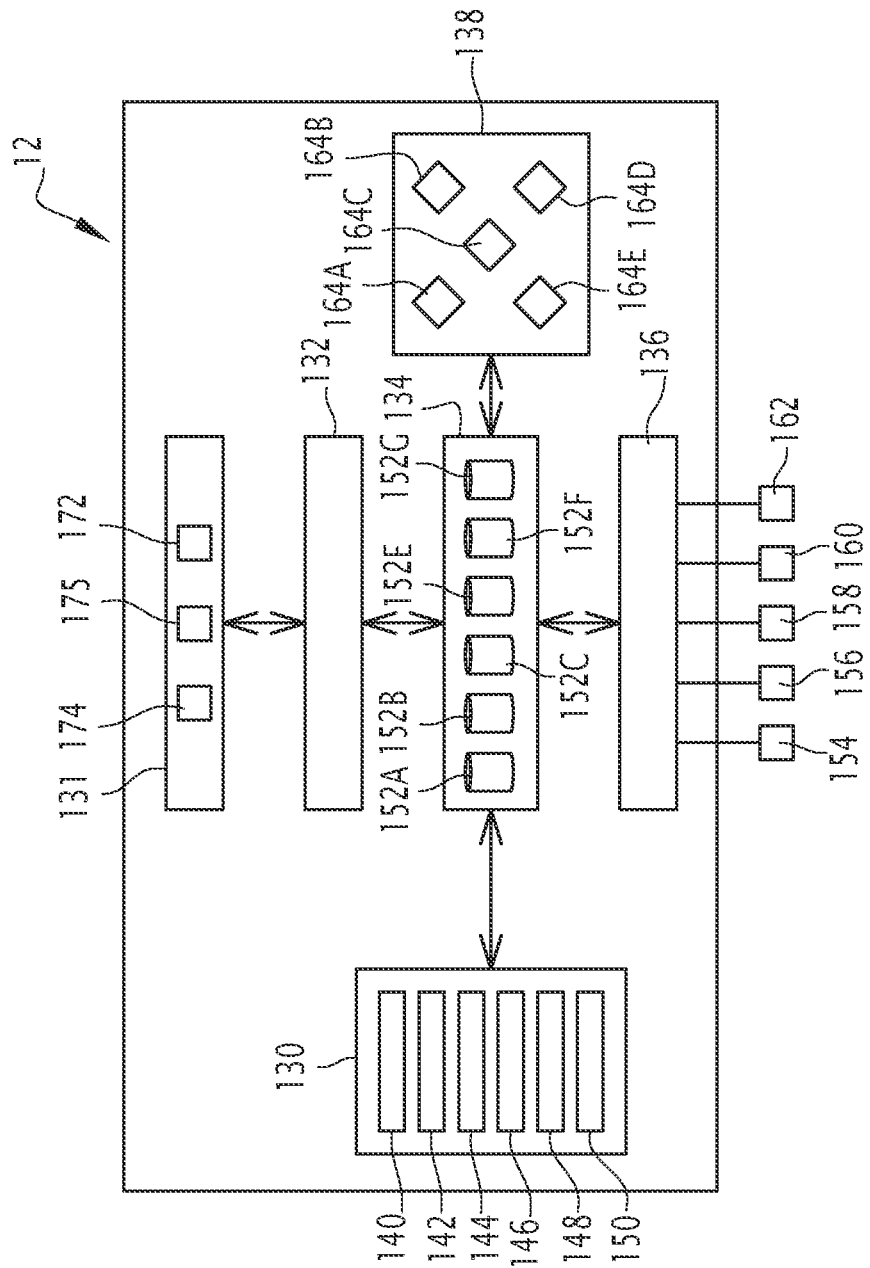
FIG. 3 schematically illustrates an aircraft device for receiving computer files from the remote distribution system.

The system 10 is intended for distributing aircraft computer files to a plurality of aircraft devices 12, examples of which are shown schematically in FIGS. 1 and 3.

In particular, the aircraft is a civil aircraft, including a business aircraft, a military aircraft, or a drone.

The computer files are, for example, applications, kernels or computational modules, databases, including documentation databases, system configuration databases, aircraft identity databases, operations databases, such as minimum equipment lists, operational rules, procedures, or commercial databases or applications, for example mapping databases, or navigation applications.

The aircraft devices 12 configured for receiving computer files from the remote distribution system 10 each comprise at least one memory for receiving the computer files and a processor for executing computer files received from the remote distribution system 10 or using data from computer files received from the remote distribution system 10.

The aircraft devices 12 configured for receiving computer files from the remote distribution system 10 are, for example, onboard devices, such as computers present in the avionics 14 or in the aircraft systems 16. These onboard aircraft devices 12 meet the certification requirements of the aircraft. They are permanently mounted in the aircraft.

The aircraft devices 12 also comprise non-onboard devices, such as electronic flight bags 18, cabin comfort management systems 20, or maintenance management systems 22.

The non-onboard devices 12 generally take the form of laptop computers, portable electronic devices, including tablets and/or cell phones. These systems are generally not subject to aircraft certification requirements. They are generally suitable for use both on and off the aircraft. In a variant, the non-onboard devices 12 are ground-based devices advantageously replicated from the onboard devices. These are ground-based computers that replicate computers present in the avionics 14 or in the aircraft systems 16, for example.

The onboard aircraft devices 12 are generally organized by domains, including in particular an operations domain, comprising the onboard computers and the avionics computers in particular, a maintenance domain, comprising the computers for detecting and managing failure(s) and defects, and the maintenance computers, and a client domain comprising the entertainment systems, the cabin management systems, for example.

With reference to FIG. 2, the remote distribution system 10 comprises at least one computer 30 comprising at least one processor 32 and a memory 34 containing software modules suitable for execution by the processor 32. This computer 30 is not onboard and is configured for communicating with the or each aircraft device 12 via a data transmission network, in particular a wireless data transmission network.

According to the present disclosure, the remote distribution system 10 comprises a file store 36, an interface 38 for communicating with computer file sources and with a client database, and an interface 42 for communicating with the or each aircraft device 12.

The system 10 further comprises a computer file manager 44 and an interface 46 for linking with an administration station 48 having a display and a human/machine interface.

The file store 36 is configured for storing a plurality of computer files from each aircraft manufacturer, each aircraft operator, or from suppliers external to the manufacturer and operator of each aircraft, for selective remote distribution to the or each aircraft device 12.

The file store 36 is fed from file sources 50 through 56 via the communication interface 38.

Each computer file contained in the file store is identified at least by a file name, an identification number, an operating medium specific to that file (such as a computer operating system), a file version and/or optionally, by a creation date and modification date as well as by a file category. The file store 36 also contains at least one list of computer files from the file store 36 present in the or each aircraft device 12 configured for connecting with the remote distribution system 10. It is configured for receiving a list of computer files from the file store 36 loadable into the or each aircraft device 12, and a list of computer files from the file store 36 that must be loaded into the or each aircraft device 12, the latter lists being established by the file manager 44 and by the manufacturer, as will be discussed below.

The communication interface 38 is configured for communicating with at least one source 50 of applications, manufacturer kernels, and manufacturer data (technical or commercial), including, for example, generic applications 50A and generic computation kernels or software modules 50B from the manufacturer. It is also configured for communicating with at least one source 52 of aircraft configuration files, comprising for example generic databases 52A from the manufacturer, in particular electronic aircraft documentation databases, system databases, and/or aircraft configuration identification databases.

Advantageously, the communication interface 38 is also configured for communicating with a source 54 of operator files comprising generic operations databases 54A, such as minimum equipment list databases, procedures databases, crew databases, or operations rules databases.

The communication interface 38 is also configured for communicating with a source 56 of vendor files including, for example, generic vendor databases 56A, such as maps, or specific vendor applications 56B, such as information viewers, utilities, business applications.

The communication interface 38 is also configured for connecting to a client database 58. The client database 58 comprises an identification and an aircraft configuration of the or each aircraft configured for receiving files from the remote distribution system 10, the or each aircraft constituting a fleet.

The aircraft configuration comprises, but is not limited to, aircraft type, aircraft identification, aircraft equipment options, aircraft modifications, and aircraft layout.

The client database 58, for each aircraft, comprises an identification of the aircraft devices 12 associated with that aircraft, the computer configuration of each aircraft device 12, and the modes of operation associated with that aircraft.

In particular, the computer configuration comprises the operating system of the aircraft device, the list of computer files present on the aircraft file associated with their version.

In addition, the client database 58 is configured for defining the rights and subscriptions available to the user of the aircraft device 12 to receive the computer files stored in the file store 36, for each aircraft device 12.

The communication interface 38 is configured for connecting with each of the sources 50-56 and the client database 58 at a given frequency or on request, to load new computer files into the file store 36.

It is also configured for transmitting data to the client database 58 for possible updating the computer configurations of the or each aircraft device 12, once the computer files from the file store 36 has been distributed to the or each aircraft device 12.

The file manager 44 is configured for querying the client database 58 and/or the aircraft configuration file sources 52 to identify, for each aircraft device 12, the aircraft configuration, the computer configuration of each aircraft device 12, including the computer files present on each aircraft device 12, in order to define, from among the computer files present in the file store 36, a list of files loadable into each aircraft device 12, to update at least one existing computer file already loaded into the aircraft device 12, and/or to add at least one computer file in the aircraft device 12.

To this end, the file manager 44 is configured for querying the client database 58 and/or the aircraft configuration file source 52, in particular the aircraft identification database, to determine, for each aircraft device 12, the or each fleet aircraft associated with that device, the aircraft configuration of that aircraft, the computer configuration of the aircraft device 12, the list of computer files present in the aircraft device 12, the version of each computer file in the list and the operating system required to use each computer file in the list, and/or the rights and subscriptions associated with the user of the aircraft device 12.

Having done this, the file manager 44 is configured for querying the file store 36 to compare the computer files present in the file store 36 with those in the list of computer files present on each aircraft device 12 and determine the list of computer files loadable into the aircraft device 12, based on the aircraft configuration, the computer configuration of the aircraft device 12, the version of each file already present in the aircraft device 12, and/or the rights and subscriptions associated with the user of the aircraft device 12.

As noted above, the list of files loadable into each aircraft device 12 comprises updates to computer files already present in the aircraft device 12 and/or new computer files not present in the aircraft device 12.

Thus, the file manager 44 is configured for establishing a list of files that may be remotely distributed from the file store 36 to the or each aircraft device 12.

In addition, the file manager 44 is configured for activating the remote distribution of a list of files that must be remotely distributed, established from the list of files that may be remotely distributed, automatically or upon validation by the user of the aircraft device 12.

Figure 4:
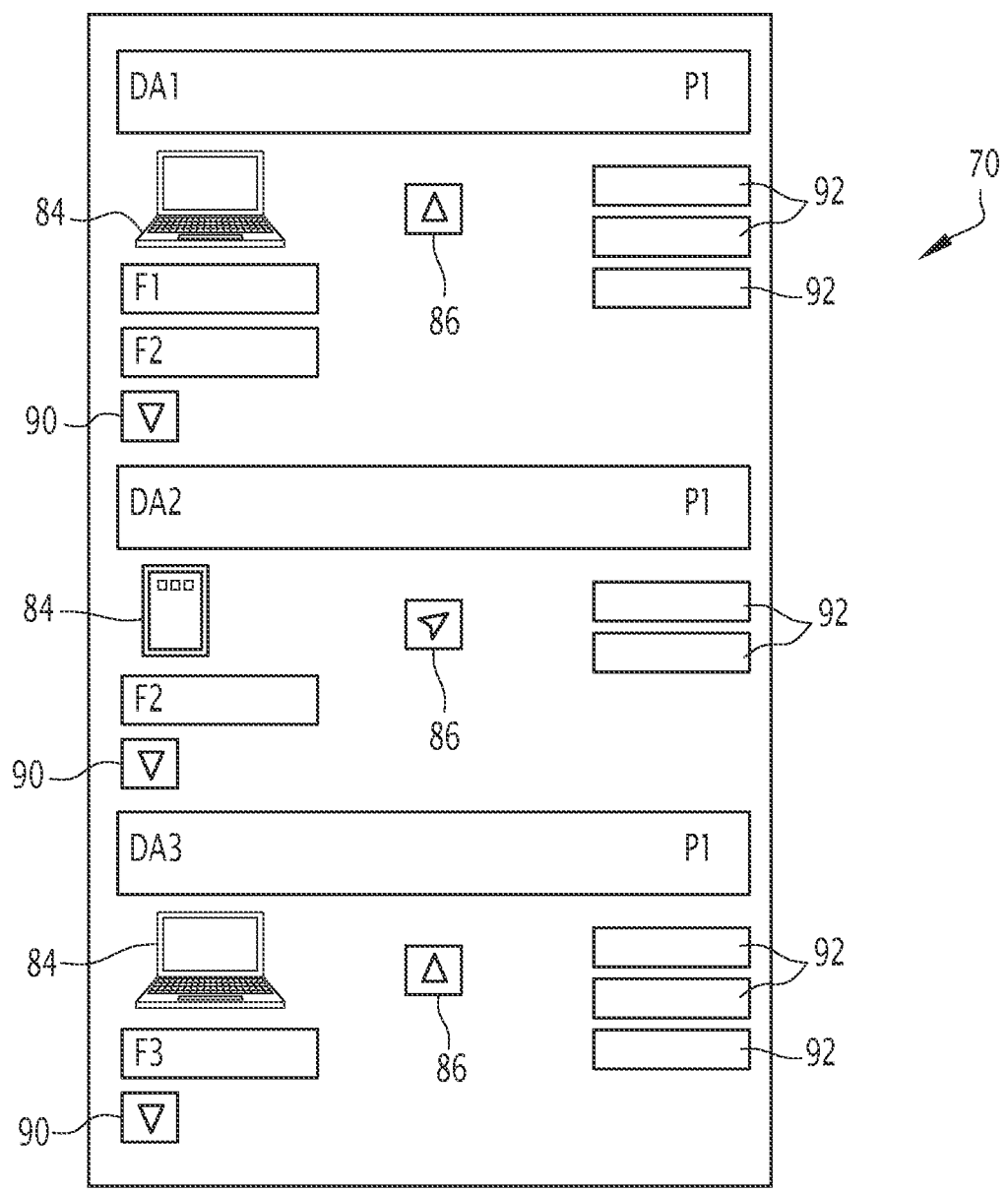
FIG. 4 illustrates a graphical interface for defining computer files present on each aircraft device in a fleet.
Figure 5:
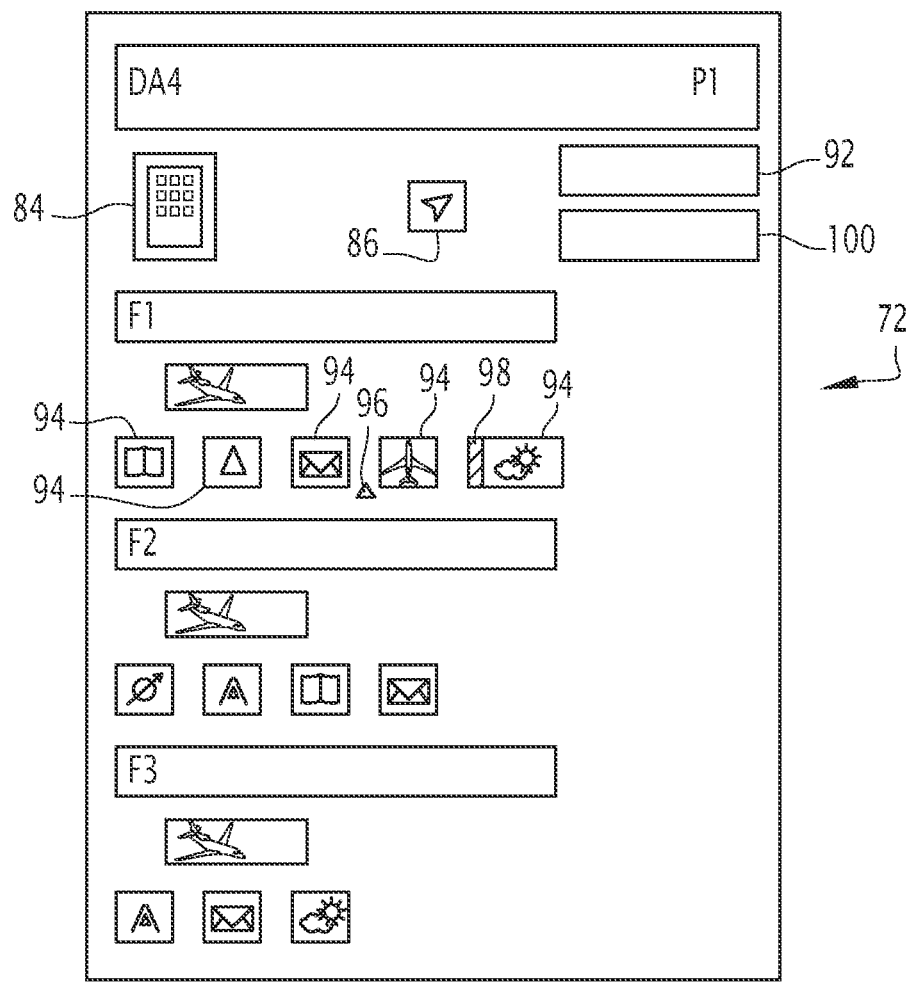
FIG. 5 illustrates a graphical interface for device management.
Figure 6:
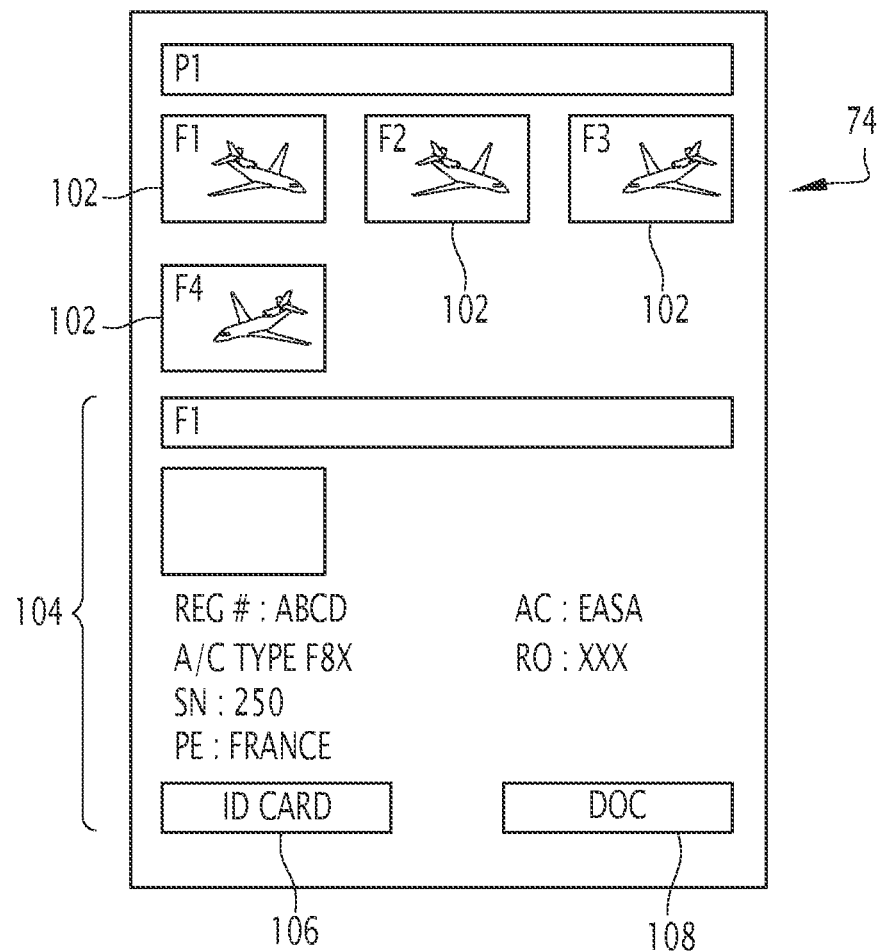
FIG. 6 illustrates a graphical interface for aircraft configuration management.
Figure 7:
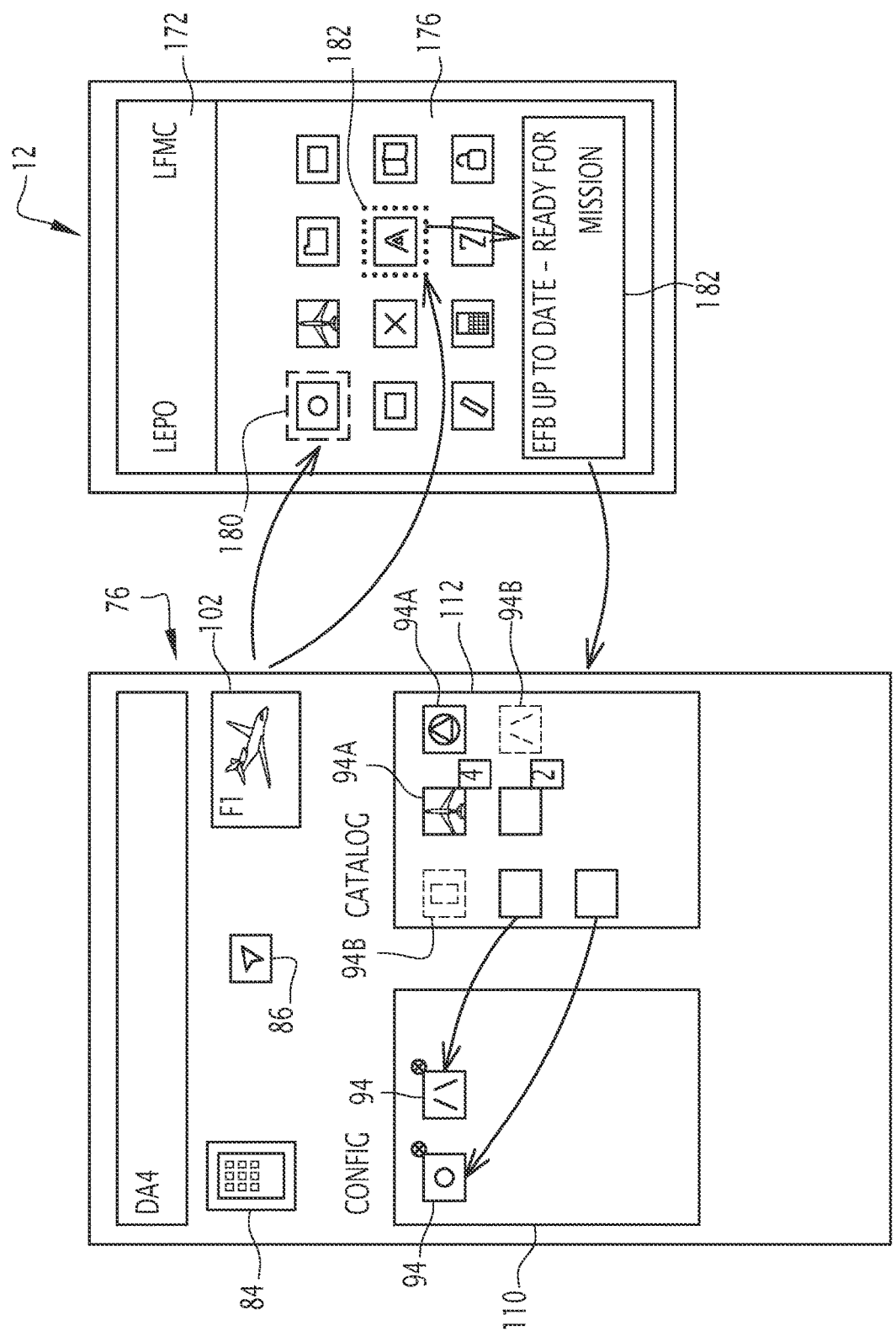
FIG. 7 illustrates a graphical interface for configuration editing.

To facilitate file management by an administrator and/or user, the file manager 44 is configured for generating graphical interface data to display on the administration station 48 or in the aircraft device 12, at least one graphical interface selected from a fleet management graphical interface 70, visible in FIG. 4, a device management graphical interface 72, visible in FIG. 5, an aircraft configuration management graphical interface 74, visible in FIG. 6, and a configuration editing graphical interface 76, visible in FIG. 7.

Figure 9:
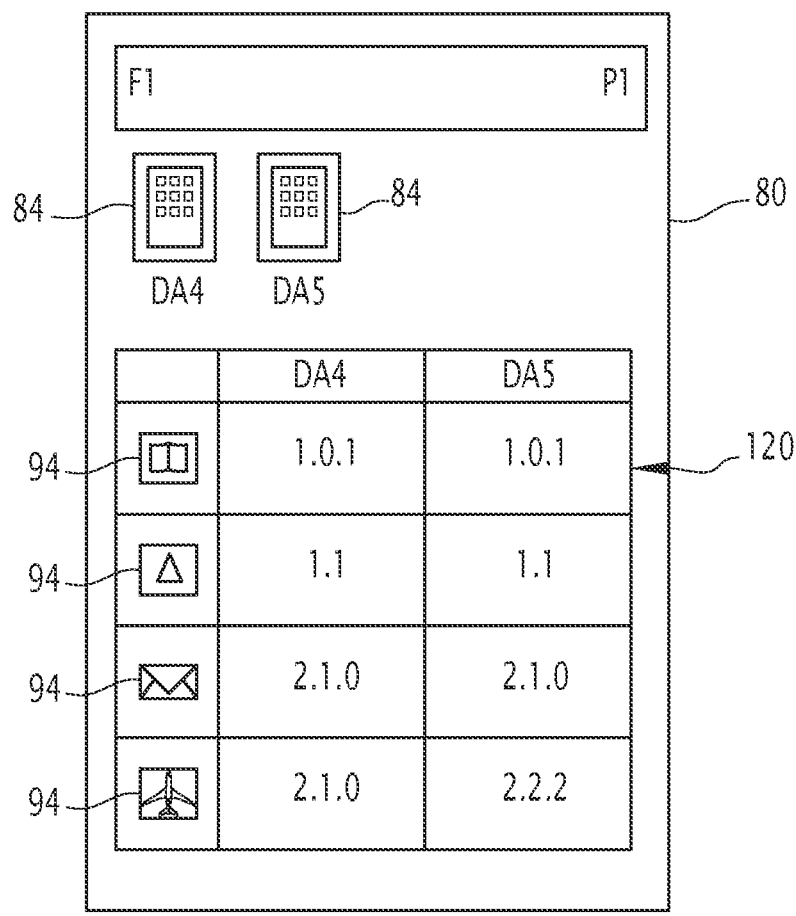
FIG. 9 illustrates a graphical interface for comparing configurations between at least two aircraft devices in a fleet.

The file manager 44 is further configured for creating a publication management graphical interface 78, visible in FIG. 8, and optionally, a graphical interface 80 for comparing aircraft 12 device configurations, visible in FIG. 9.

Figure 13:
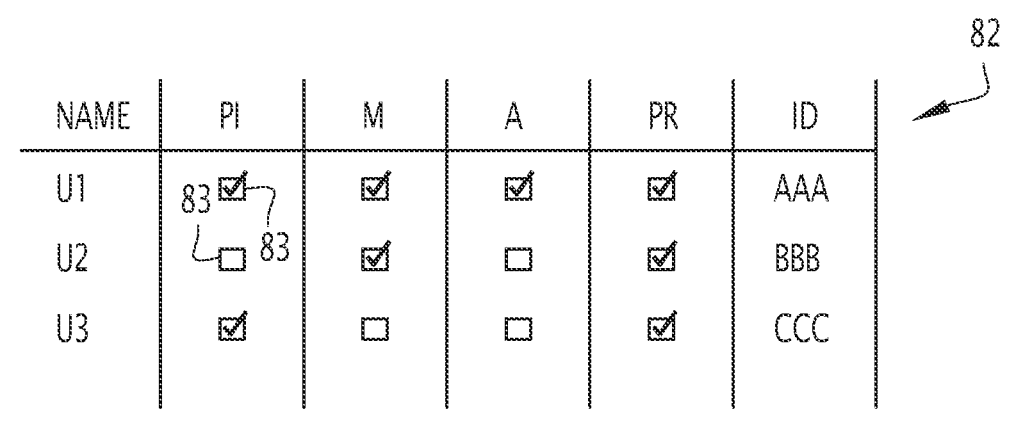

Possibly, the file manager 44 is also configured for generating a graphical user rights management interface 82, visible in FIG. 13.

As illustrated in FIG. 4, the fleet management graphical interface 70 is configured for identifying all aircraft devices 12 associated with a given aircraft or fleet of aircraft. Thus, in the example shown in FIG. 4, all aircraft devices DA1 through DA3 associated with an aircraft fleet are listed in sequence, regardless of whether those devices DA1 through DA3 are onboard devices or not.

On the graphical interface 70, each aircraft device 12 is classified by a device name DA1 through DA3, and by a device type icon 84. Each device DA1 through DA3 is associated with a list of aircraft F1, F2, F3 with which it may be associated. In addition, the device operating system is represented by an operating system type of icon 86.

The interface 70 further allows a user to add other aircraft associated with a particular device DA1 through DA3 via an add button 90.

Buttons 92, for each identified device, also makes it possible enable access the licenses owned by the device, to order new ones, to work in offline mode, or to show the current status of the device, along with the list of computer files loaded into that device by accessing the device management graphical interface 72.

With reference to FIG. 5, the device management graphical interface 72 also features a device name DA4, a device-type icon 84, an operating system-type icon 86, and activation buttons 92.

For each aircraft associated with the DA4 device, the graphical interface 72 also lists the computer files present in the aircraft device 12 that are compatible with the aircraft configuration, in the form of computer file icons 94.

The graphical interface 72 further shows a pictogram 96 associated with certain computer file icons 94 to illustrate which computer file requires updating.

In addition, if the computer file version is a beta version, this is illustrated by a banner 98 marked on the file icon 94.

In the example shown in FIG. 5, the same DA4 device can be used with multiple aircraft F1, F2, F3. Depending on the aircraft F1, F2, F3 and its aircraft configuration, different sets of computer files are accessible to the user using the aircraft device 12, as shown by the icons 94 depicted for each aircraft F1, F2, F3.

For example, a portion of the computer files on the DA4 device are accessible only when a particular aircraft F1 is used, and are not available when other aircraft F2, F3 are used.

In addition, for each aircraft F1, F2, F3 associated with the DA4 device, the graphical interface 72 comprises a configuration edit button 100 that provides access to a window (not shown), in which each of the DA4 device applications applicable to that aircraft are listed as computer file icons 94, the latest configuration version of that computer file in the aircraft device 12, and the relevant configuration of each computer file that should be present in the aircraft device 12. This applies to any computer file type, whether these files are applications or databases.

The presence of each of the icons 84, 86, 94, pictograms 96, and banners 98 on the interface 72 is determined by the file manager 44 from the list of computer files present in the device FA4, the aircraft configuration F1, F2, F3, and the computer configuration of the aircraft device 12.

For each aircraft fleet associated with a user P1 of the system 10, the configuration management graphical interface 74 shown in FIG. 6 comprises an aircraft configuration icon 102 associated with each aircraft F1 through F4 in the fleet.

By selecting the aircraft configuration icon 102, characteristics of the aircraft configuration, such as the aircraft registration number, REG #, the aircraft type, A/C TYPE, the aircraft serial number, SN, the aircraft country of registration, PE, the certification authority, AC, and the operating rules, RO, can be displayed in a window 104.

A detailed aircraft identity card can be obtained based on the aircraft configuration file from the aircraft configuration data by selecting a first button 106. Similarly, a set of relevant documentation determined from the aircraft configuration file sources 52, based on the aircraft configuration identification can be obtained by selecting a second button 108

The configuration editor graphical interface 76 is shown to the left of FIG. 7. As previously, this graphical interface 76 comprises a device type icon 84 and an operating system type icon 86.

The graphical interface 76 comprises a current configuration window 110, identifying the computer files present in the aircraft device 12 by icons 94, when associated with the identified aircraft DA4.

The graphical interface 76 also comprises a catalog window 112, identifying the computer files present in the file store 36. by icons 94A, loadable into the aircraft device 12, corresponding to the list of computer files loadable into the aircraft device 12 established by the file manager 44.

The icons 94A in the catalog window 112 are suitable for selection by a user to be moved to the configuration window 110 to allow selective definition, by the user, of computer files that must be loaded from the file store 36 into the aircraft device 12.

Based on the icons 94 of computer files present in the configuration window after moving the icons 94A, the file manager 44 is configured for creating a list of computer files that must be loaded into the aircraft device 12.

In the example shown in FIG. 7, the catalog window 112 further comprises computer file icons 94B not accessible to the user, with a representation distinct from that of the icons 94A, to illustrate computer files in the file store 36 that may not be distributed to the aircraft device 12 due to the computer configuration of the aircraft device 12, for example, or to a lack of operator-controlled licenses. Additionally, for each new configuration created by the operator, vendor-specific files may also be selected for future installation.

With reference to FIG. 8, the file publishing graphical interface 78 is configured for displaying a list of files just published in the file store 36 by classifying them by file category (CATEGORY), by last version (LAST VERSION), by denomination (LABEL), optionally by code, by creation date (CREATED DATE), and by modification date (MODIFIED DATE). Thus, a user is able to view new files that have been uploaded into the file store 36, as they are uploaded.

As seen in FIG. 9, the device comparison graphical interface 42 is configured for comparing the configurations of two parallel devices DA4, DA5 by listing, in a comparison window 120, the icons of files 94 loaded into each of the devices DA4, DA5, and the associated computer file versions present on these devices DA4, DA5. This comparison is performed by the file manager 44 by comparing the present file configurations and the present versions in the present file lists obtained by the file manager 44.

As seen in FIG. 13, the rights management graphical interface 82 is configured for listing the rights associated with each aircraft device user 12 based on the status of the user, including pilot PI, maintenance M, administrator A, and aircraft device owner PR 12 by providing an administrator with the ability to modify the rights, for example by clicking on selection icons 83. Upon modification of the user's rights, the client database 58 is modified accordingly by the remote distribution system 10.

Similarly, the availability of a service is configured for automatic deletion based on the subscription end date or on changes in the rights given to a user.

Each aircraft device 12 according to the present disclosure comprises at least one processor and a memory comprising software modules suitable for execution by the processor.

As illustrated in FIG. 3, the aircraft device 12 advantageously comprises at least technical modules 130, enabling the aircraft device 12 to be managed, a user interface 131, an interface 132 for receiving computer files from the remote distribution system 10, and at least one data server 134.

The aircraft device 12 further comprises an aircraft communication interface 136 and optionally a computational server 138.

In the example shown in FIG. 3, the aircraft device 12 is an electronic flight bag consisting of a portable electronic device, such as a tablet, but this may also be an onboard aircraft computer.

The technical module 130 comprises a plurality of software applications, for example a program launch application 140, a safety application 142 for ensuring the safety of the aircraft device 12, a settings application 144 for storing and defining the settings of the aircraft device 12, a communication application 146 for controlling communication with the remote distribution system 10 and with the aircraft, and a subscription application 148 for managing subscriptions, access to computer files from vendors, and a signature application 150.

The reception interface 132 is configured for connecting to the remote distribution system 10 via a data transmission network (not shown), in particular a wireless data transmission network.

It is configured for receiving data from the remote distribution system 10, in particular lists of files that must be loaded into the aircraft device 12, prior to loading them, and computer files received from the file store 36, during their loading.

The interface 132 is configured for communicating with databases of the data server 134 on the one hand, and with the computational server 138 on the other hand.

The data server 134 comprises a plurality of databases intended in particular to receive data from the remote distribution system 10.

The databases comprise local documentation databases 152A, local aircraft status and aircraft dictionary databases 152B, local airport databases 152C, local aircraft regulation databases 152D, local crew databases 152E, and local operation databases 152F. Each of the local databases 152A through 152F is intended to receive data from application sources 50, operator file sources 54, and vendor file sources 56, inter alia.

The aircraft interface 136 is configured for allowing communication between the local databases 152A to 152E and/or the calculation server 138, on the one hand and, the aircraft computers, on the hand. The aircraft computers comprise, in particular, a flight director 154, an aircraft systems computer 156, a maintenance systems computer 158, a communication system computer 160, and an entertainment system computer 162.

In this example, the computational server 138 comprises computational kernels for performing aircraft navigation computations, such as low-speed performance computation applications 164A, high-speed performance computation applications 164B, aircraft weight and balance computation applications 164C, route determination applications 164D, and aircraft status determination applications 164E.

The user interface 131 comprises a display 172 visible in FIG. 7 and a display management assembly 174. The user interface 131 further comprises interaction and input means 175, such as a touch screen, or a real or virtual keyboard.

The display management assembly 174 is configured for displaying a graphical communication interface 176 on the screen 172, for communication with the remote distribution system 10.

The graphical communication interface 176 displays icons of computer files 94 present in the aircraft device 12 and an update marking 180 of at least some of the computer files, obtained from the list of files that must be loaded into the aircraft device 12 established by the file manager 44.

The graphical communication interface 176 is further configured for displaying an icon 182 or/and marking 182 indicating a new file to be loaded into the aircraft device 12, the marking 182 being obtained from the list of files that must be loaded into the aircraft device 12 established by the file manager 44.

The user of the aircraft device 12 is then able to select the files to be updated using the marking 178 and the files to be added using the marking 180 to allow them to be downloaded from the file store 36 to the aircraft device 12 via a data transmission network, including a wireless data transmission network.

When the upload is completed, the onboard or mobile communication graphical interface 176 is configured for displaying an upload status message 182 of successful upload status (in this case EFB UP TO DATE—READY FOR MISSION), for example, and to transmit file upload status information to the remote distribution system 10 for updating the computer configuration of the aircraft device 12 in the software store 36 and/or in the source 52 of aircraft configuration files.

Figure 12:
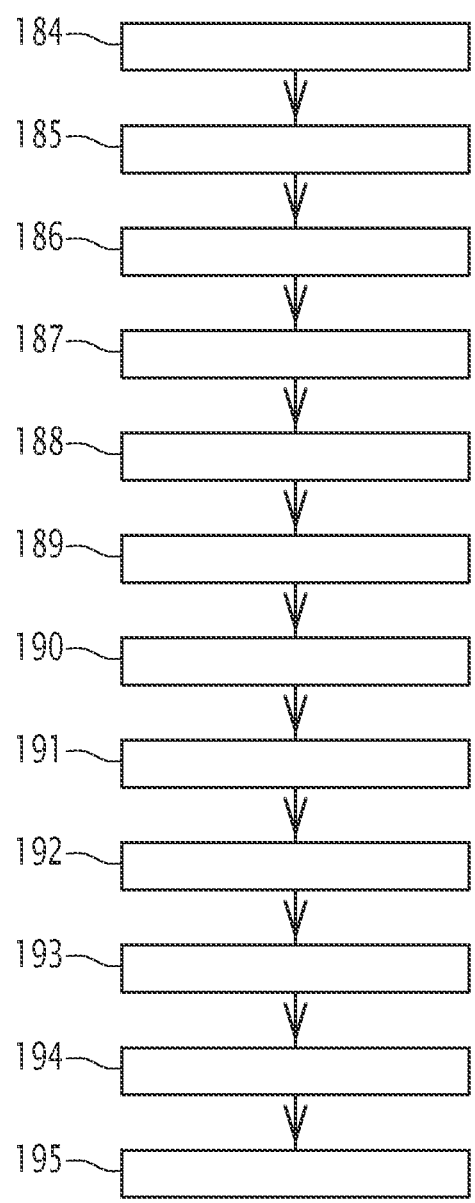
FIG. 12 illustrates the main steps of a remote distribution process according to the present disclosure.

The operation of the remote distribution system 10 will now be described, with particular reference to FIG. 12.

Initially, in step 184, the file store 36 activates the communication interfaces 38 to load applications, aircraft configuration files, operator files from the sources 50, 52, 54, 56 and the client database 78.

Then, in step 185, the file manager is configured for generating the file publishing graphical interface 78, to enable listing of files that have been recently published.

In step 186, the file manager 44 identifies a computer configuration associated with each aircraft device 12 that may be connected to the remote distribution system 10 and an aircraft configuration of each aircraft associated with each aircraft device 12.

To this end, the file manager 44 loads the aircraft configuration from the aircraft file source 52 to obtain the technical characteristics of the aircraft, and loads the computer configuration to obtain the computer files already present in the aircraft device 12 in particular, as well as their version.

The file manager 44 further queries the client database 58 to determine, for example, the rights and subscriptions that the user of the aircraft device 12 has.

In step 187, the aircraft manager 44 compares the list of computer files present in the file store 36 with the list of computer files present on each aircraft device 12.

The file manager 44 thus determines which of the computer files in the file store 36 loadable into each aircraft device 12 based on the aircraft's aircraft configuration, including the equipment and systems present in the aircraft, the computer configuration of the aircraft device 12, including its operating system, and based on the rights and subscriptions available to the user of the aircraft device 12 obtained from the client database 58.

The file manager 44 thus obtains, for each aircraft device 12, a list of computer files loadable into the aircraft device 12, based on the aircraft configuration, the computer configuration of the aircraft device 12, the version of each computer file already present in the aircraft device 12, and/or the rights and subscriptions associated with the user of the aircraft device 12.

The list of computer files loadable into each aircraft device 12 comprises updates to computer files already present in the aircraft device 12 and/or new computer files not present in the aircraft device 12.

Having done so, in step 188, the file manager generates the data necessary to display the fleet management graphical interface 70, the device management graphical interface 72, the configuration management graphical interface 74, and the configuration editing graphical interface 76.

At step 189, an administrator of the download system 10 logs into an administration station 48 to view the fleet management interface 70, for example, or the device management interface 72.

The administrator thus views which files are currently present in the aircraft device 12, and from among these files, which files must be updated with a new version, including by the presence of a signaling pictogram 96. In addition, the administrator views whether new files may be loaded into the aircraft device 12.

The administrator then optionally displays the configuration editing graphical interface 76, and selects the files that must be loaded into the aircraft device 12 from the files in the catalog window 112 by dragging them into the configuration window 110.

In step 190, the file manager 44 then determines the computer files that must be loaded into the aircraft device 12, whether by using the entire list of files loadable into the aircraft device 12, particularly when the loading is automatic, or based on the files present in the configuration window 110, when the administrator has selected files using the graphical interface 76.

Then, in step 191, the file manager 44 transmits the list of computer files that must be loaded into each aircraft device 12 to the relevant aircraft device 12, in particular via a data transmission network, in particular, a wireless data transmission network.

In step 192, a user activates the aircraft device 12. The management assembly 174 generates the communication graphical interface 176, in which the files to be added are identified by markings 178, 180 pointing to the respective files to be updated, based on the list of computer files to be transmitted generated by the file manager 44 and transmitted to the aircraft device 12.

In step 193, either automatically, or upon validation by a user of the aircraft device 12, the file manager 44 then activates a synchronization to transmit the or each computer file to be loaded into the aircraft device 12 from the file store 36 to the aircraft device 12.

The transmission occurs through the communication interface 42, a data transmission network comprising a wireless data transmission network, and through the receiving interface 132, in succession.

The uploaded computer files feed, in particular, the local databases 152A through 152F, the computational kernels in the computational server 138, or are transmitted to the aircraft via the aircraft communication interface 136, to update the aircraft's computer files.

In step 194, when the files have been remotely distributed, the aircraft device 12 generates a report defining the distribution status of the files that must be loaded, the status being, a successful or incomplete upload, for example.

Based on this status, in step 195, the file manager 44 updates the computer configuration of each aircraft device 12 to change the list of files now present in the aircraft device 12.

The remote distribution system 10 according to the present disclosure is therefore particularly effective for managing a fleet of aircraft having a plurality of onboard or non-onboard aircraft devices 12 associated with each aircraft in the fleet and requiring regular updating.

The remote distribution system 10 is configured for listing precisely which computer files are present on each of the aircraft devices 12, and, based on the aircraft configuration of the aircraft associated with the aircraft device 12, and the computer configuration of each aircraft device 12, identifying which files may be transmitted from the software store 36 to each aircraft device 12 for updating or adding computer files.

The remote distribution system 10 is configured for further generating graphical interfaces 70-82 that allow an administrator or user to easily manage a fleet, a particular aircraft device 12, or a configuration of a particular aircraft device 12, to determine which new files have been published to the file store 36, and to compare existing devices, as well as to manage user rights.

Figure 10:
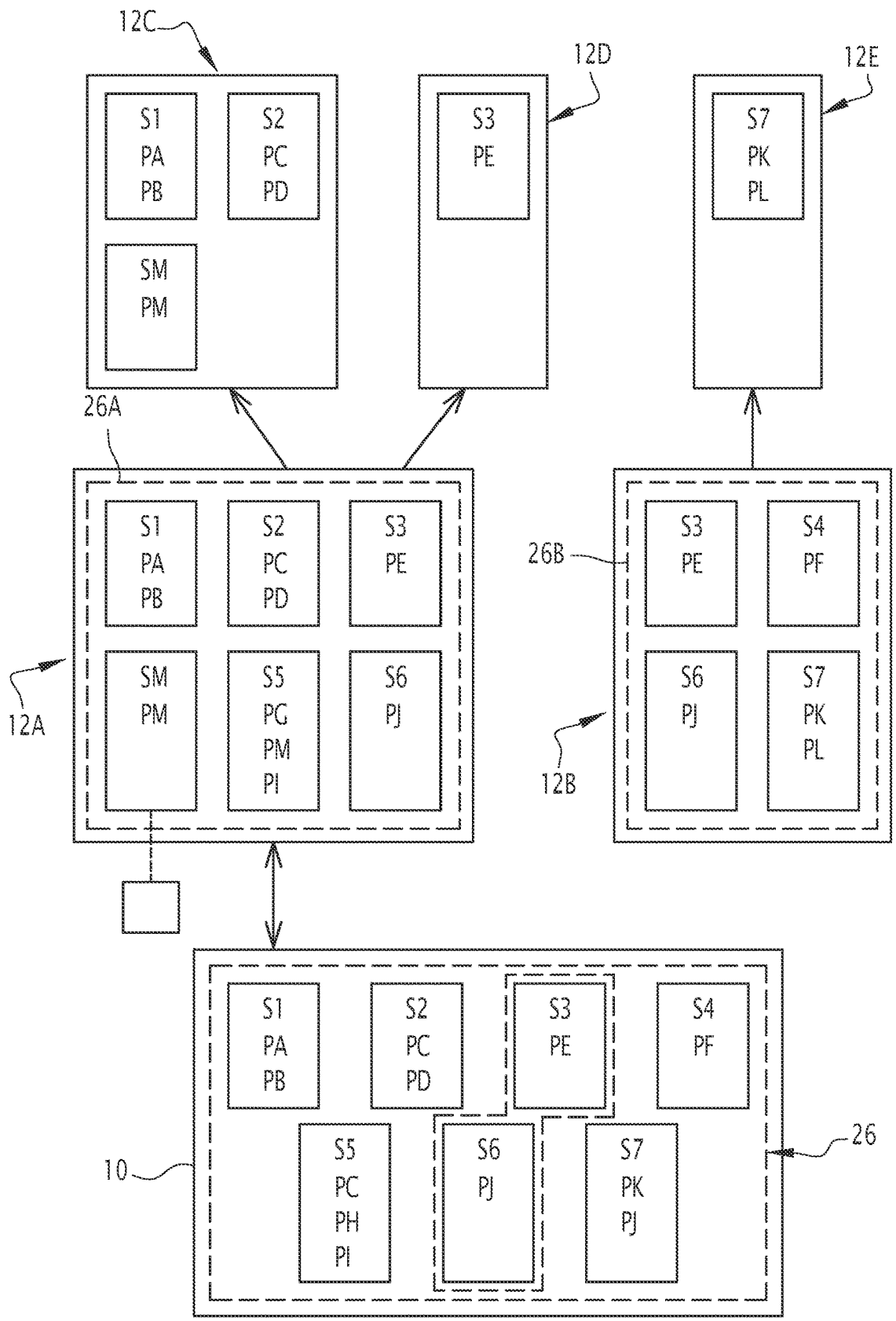
FIG. 10 schematically illustrates a second remote distribution system according to the present disclosure.

In an embodiment illustrated in FIG. 10, at least one onboard, mobile, or ground replicated 12B aircraft device 12A connected to a central remote distribution system 10 is itself a remote distribution subsystem analogous to the central system 10, but containing a file store 26A, 26B separate from the store 26 of the central system 10.

Thus, an onboard, mobile, or ground-replicated aircraft device 12A is configured for acting as a remote distribution subsystem for the devices 12C, 12D to which it is connected. The file store 36A of the aircraft device 12A comprises a portion of the computer files in the store 36 of the central remote distribution system 10.

The file store 36A also optionally comprises its own computer files SM, which are not updated using the central remote distribution system 10, but which come from a separate file source.

In the example shown in FIG. 10, a portion of the computer files in the store 36 of the central remote distribution system 10, for example the service set S1, S2, S3, S5, and S6, is thus sent to the aircraft device 12A which itself constitutes a first remote distribution subsystem.

Similarly, another set of computer files distinct from the set of computer files sent to the aircraft device 12A, for example the set of services S3, S4, S6, S7, is sent to the aircraft device 12B, itself constituting a second remote distribution subsystem.

In this way, it is possible to differentially manage part of the aircraft fleet with an intermediate aircraft device 12A, 12B acting as a distribution subsystem, to which other devices 12C, 12D, 12E are connected.

Figure 11:
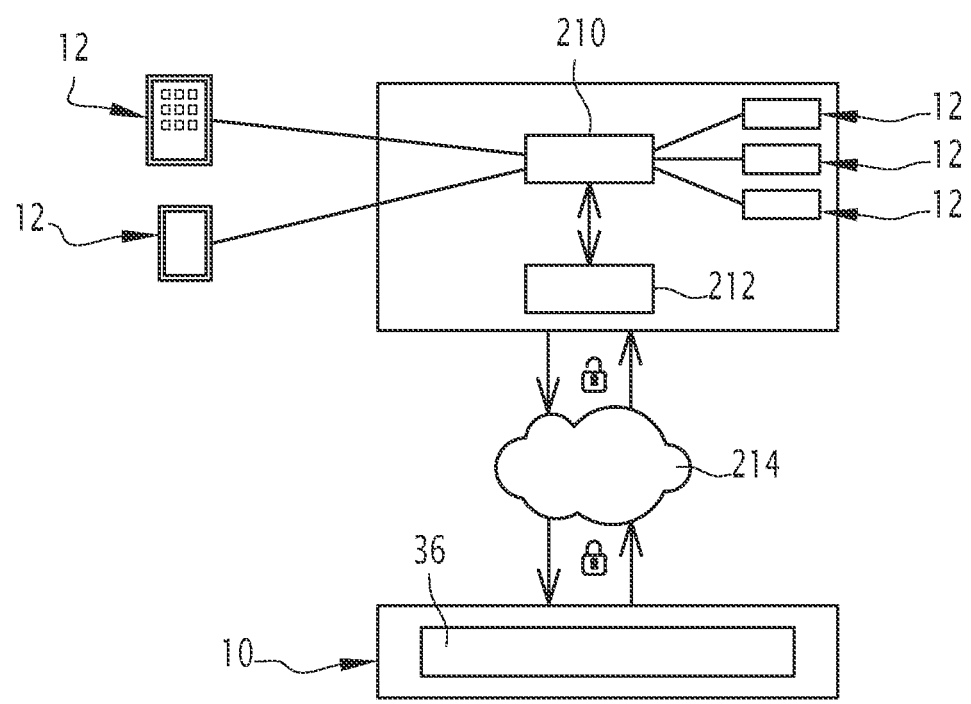
FIG. 11 schematically illustrates a third remote distribution system according to the present disclosure.

In the embodiment illustrated in FIG. 11, the remote distribution system 10 comprises a file store duplication cache 210 of the file store 36, the cache 210 being onboard the aircraft.

The cache 210 is updated by the file manager 44 via an onboard router 212 and a communication network 214, in particular a wireless communication network, as soon as the data transfer rate permits.

The cache 210 comprises at least part of the computer files in the file store 36 loadable into the aircraft, according to the aircraft configuration of the aircraft and the computer configurations of all the aircraft devices 12 associated with the aircraft, even if those files are not listed in a list of files that must be loaded into an aircraft device 12.

Thus, after the file manager 44 has established a list of computer files that must be loaded, when the user activates the downloading of computer files from that list, or when this activation occurs automatically, the computer files in the list are downloaded directly from the cache 210 present in the aircraft, without needing to pass through a wireless communication network between the file store 36 and the aircraft device 12.

This does not delay the updating of computer files in the aircraft devices 12, even in the absence of a communication network between the file store 36 and each aircraft device 12.

What is claimed is:

1. A remote distribution system for aircraft computer files, the remote distribution system including a system processor and a system memory, the remote distribution system comprising:

an aircraft computer file store, contained in the system memory and for execution by the system processor, containing data or applications, at least two of the aircraft computer files of the computer file store being for loading into respectively at least two distinct onboard, mobile or ground-replicated aircraft devices, each aircraft device comprising a processor and a memory, the aircraft device being associated with at least one aircraft; and a file manager, contained in the system memory and for execution by the system processor, configured for each aircraft device, for:

identifying an aircraft configuration of the aircraft with which the aircraft device is associated and a computer configuration of the aircraft device;

defining, from among the computer files in the computer file store, at least one computer file loadable into the aircraft device, by querying the computer file store to compare the computer files present in the computer file store with computer files present on the aircraft device and to determine the at least one computer file being loadable based on the identified aircraft configuration, the identified computer configuration, and a version of each file already present in the aircraft device; and activating a synchronization, automatically or on a user's command, for remote distribution, via a wireless data transmission network, of at least one computer file to be loaded into the aircraft device, selected from among the one or more computer files loadable into the aircraft device according to the identified aircraft configuration and computer configuration, wherein:

the at least two distinct aircraft devices being onboard devices respectively belonging to at least two distinct domains, chosen between an operations domain, a maintenance domain, and a client domain, or at least one of the at least two distinct aircraft devices being a mobile or ground-replicated device.

2. The system according to claim 1, further comprising a communication interface to at least one source of computer files generated by an aircraft manufacturer, to at least one source of computer files generated by an aircraft operator, and/or to at least one source of aircraft computer files generated by a provider of aircraft computer files, the communication interface being configured to allow loading of new computer files from the or each source into the file store.

3. The system according to claim 1, further comprising a communication interface to a client database, the client database defining for each user of an aircraft device, loading rights, and/or subscriptions linked to said user for said aircraft device, the file manager being configured for querying the client database to define the or each computer file loadable into the aircraft device according to the loading rights and/or subscriptions linked to said user for said aircraft device.

4. The system according to claim 1, wherein the file manager is configured for generating data for a device management graphical interface comprising an identification of the type of aircraft device, a list of computer files present in the aircraft device, an identification of computer files that must be updated in the aircraft device and/or an identification of computer files that must be added to the aircraft device from among the computer file(s) loadable into the aircraft device according to the identified aircraft configuration and computer configuration.

5. The system according to claim 1, wherein the file manager is configured for generating data for a fleet management graphical interface comprising a summary of all aircraft devices associated with an aircraft or/and an aircraft fleet and computer files loadable into each aircraft device of all aircraft devices associated with the aircraft or/and the aircraft fleet.

6. The system according to claim 1, wherein the file manager is configured for generating data from a configuration editing graphical interface enabling a user to select, from among the computer files loadable into the aircraft device according to the identified aircraft configuration and computer configuration, the computer file or files that must be loaded into the aircraft device.

7. The system according to claim 1, wherein the file manager is configured for generating data from a publication management graphical interface comprising a list of computer files published in the file store, intended to be loaded into at least one aircraft device.

8. The system according to claim 1, wherein the file manager is configured for generating data from a graphical interface for comparing aircraft device configurations, comprising a comparison between computer files present on a first aircraft device and computer files present on a second aircraft device.

9. The system according to claim 1, wherein the file manager is configured for generating data from a user rights management graphical interface, configured for allowing the definition of user rights and/or subscriptions, the file manager being configured for defining the computer file or files loadable into the aircraft device according to the user rights and/or subscriptions defined on the graphical user rights management interface.

10. The system according to claim 1, wherein the file manager is configured for identifying, from among the files loadable into the aircraft device, at least one test file intended to be provided only to certain users and/or to certain aircraft devices.

11. The system according to claim 1, wherein the computer files of the file store are selected from software applications, computation kernels or software modules without user interface, databases of documentation, system states, aircraft configuration, minimum equipment lists, procedures, operational rules, geographic or aeronautical data, or/and crew data.

12. An assembly comprising:
at least one aircraft device; and
the remote distribution system according to claim 1.

13. The assembly of claim 12, wherein the aircraft device is a sub-system for remote file distribution to other aircraft devices, the other aircraft devices being associated to the same aircraft.

14. The assembly of claim 12, wherein the aircraft device is selected from an onboard aircraft device or a non-onboard aircraft device.

15. The assembly according to claim 12 wherein the remote distribution system comprises an onboard cache for duplicating the file store, the file manager being configured for enabling duplication in the onboard cache of at least some of the computer files contained in the file store, including computer files loadable into at least one aircraft device but not necessarily must be loaded into an aircraft device, the synchronization of the computer files to be loaded into the aircraft device being performed from the onboard cache.

16. The system according to claim 1, further comprising a communication interface to at least one source of computer files generated by an aircraft operator, the communication interface being configured to allow loading of new computer files from the source into the file store.

17. The system according to claim 16, wherein the source of computer files generated by an aircraft operator comprises generic operations databases, such as minimum equipment list databases, procedures databases, crew databases, and/or operations rules databases.

18. A method for the distribution of aircraft computer files to at least one aircraft device, the method comprising:
providing the remote distribution system according to claim 1;
identifying, by the file manager, the aircraft configuration of the aircraft with which the aircraft device is associated and the computer configuration of the aircraft device; and
defining, from among the computer files in the computer file store, at least one computer file loadable into the aircraft device according to the identified aircraft configuration and computer configuration, wherein the defining comprises querying the computer file store to compare the computer files present in the computer file store with computer files present on the aircraft device and to determine the at least one computer file being loadable based on the identified aircraft configuration, the identified computer configuration, and a version of each file already present in the aircraft device;
setting up a data transmission between the aircraft device and the remote distribution system; and
activating synchronization, automatically or on a user's command, to remote distribute at least one computer file to be loaded into the aircraft device selected from the one or more computer files loadable into the aircraft device based on the identified aircraft configuration and computer configuration.

* * * * *